E. GLENNON.
FLUSH VALVE.
APPLICATION FILED JAN. 29, 1919.
1,345,920.
Patented July 6, 1920.
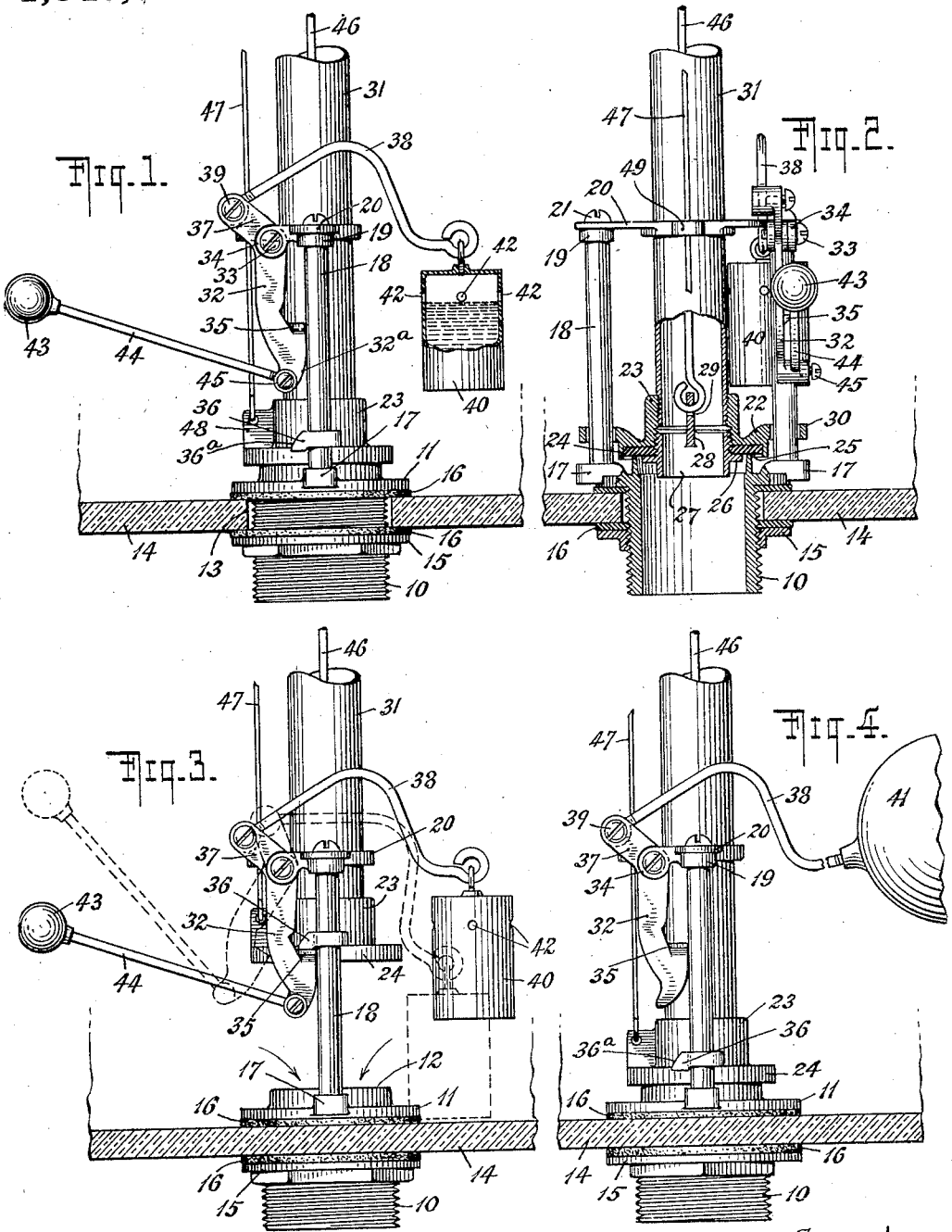

UNITED STATES PATENT OFFICE.

EDWARD GLENNON, OF BROOKLYN, NEW YORK.

FLUSH-VALVE.

1,345,920.   Specification of Letters Patent.   Patented July 6, 1920.

Application filed January 29, 1919. Serial No. 273,731.

*To all whom it may concern:*

Be it known that I, EDWARD GLENNON, a citizen of the United States, and resident of the borough of Brooklyn, county of Kings, city and State of New York, have invented certain new and useful Improvements in Flush-Valves, of which the following is a specification.

My invention relates to flush valves and has for its object to provide an improved and simplified control valve and overflow construction; my invention contemplates also the provision of an improved mechanism whereby the control valve is itself efficiently controlled. Other more specific objects of my invention will appear hereinafter and the features of novelty will be pointed out in the appended claim.

In the accompanying drawings, which for illustrative and descriptive purposes show examples of my invention, Figure 1 is a front elevation; Fig. 2 is a side elevation, partly in section; Fig. 3 is a view similar to Fig. 1 showing the valve in its open position and Fig. 4 is a side elevation showing my invention incorporated in a valve of existing construction.

As shown in the drawings the flush valve comprises an externally screw-threaded sleeve 10 having a circumferential flange 11 and a valve seat 12. The sleeve 10 extends through a suitable opening 13 in the bottom of the customary tank 14 and accommodates a nut 15 whereby the device is rigidly secured in position in said tank; in the preferred arrangement suitable gaskets 16 are located respectively between the flange 11 and the tank and the nut 15 and said tank to render the connection water tight. It will be understood that the pipe which leads to the bowl of the water closet is also connected with the sleeve 10 in the customary manner.

Lugs or ears 17 extend from said flange 11 preferably at diametrically opposite points and comprise supports for upright guide rods or posts 18, the upper ends of which are seated in sockets 19 depending from and forming part of a cross-bar 20; screws 21 or other suitable fastening devices detachably secure the cross-bar 20 upon the rods 18. The device includes further a valve member 22 having an internally screw-threaded neck 23 and a peripheral, depending flange 24 which incloses an annular valve washer or packing 25 of leather or other suitable material; the packing 25 constitutes a valve and is clamped in position by means of a horizontal flange 26 extending outwardly from a tubular nut 27 which screws into the valve member 22 and is provided with an integral transverse member 28 interiorly located and having an aperture 29 the purpose of which will appear hereinafter. The valve 25 is located so that its exposed face registers and coöperates with the valve seat 12 to shut off the flow of water from the tank 14 when the control valve is closed. At preferably diametrically opposite points the valve member 22 is formed with apertured lugs 30 through which the rods 18 extend and whereby the valve member and its connected parts are guided in vertical directions on said rods 18. A tube or pipe 31 has its one end screwed into the neck 23 of the valve-member 22 and extends upwardly in axial alinement with said member 22 and nut 27 through a suitable opening in the cross-bar 20. This tube or pipe 31 is of the necessary axial length to constitute an overflow pipe and at the same time comprises a valve stem whereby the vertical movements of the control valve are properly guided.

The device further includes a locking member 32 pivoted at 33 between lugs 34 projecting outwardly from the cross-bar 20 at the proper point, said member 32 depending from said lugs and being formed with a hook or latch 35 adapted to coöperate with a projection 36 on the valve member 22 to maintain the latter with the valve 25 and connected parts in a raised position. The member 32 is formed with a cam surface 32$^a$ and the projection 36 is provided with an inclined surface 36$^a$ which coöperate for the purpose to be more fully described hereinafter. The locking member 32 is formed with an extension 37 which carries a suitably shaped wire 38 secured in position in any suitable manner as by means of a set screw 39; in the form shown in Figs. 1, 2 and 3, my novel device 40 is suspended from said wire 38 while in the form shown in Fig. 4 the customary ball float 41 is rigidly attached to said wire. These ball floats 41, after a period of continued use, become porous or perforated through wear and thus permit the entrance of water whereby the float is rendered useless for its intended purpose, because of its loss of buoyancy. To overcome these objections, my novel device 40 comprises a hollow receptacle which may be deliberately perforated as at 42 to permit water to flow into said receptacle to add weight to the same; in the preferred construction the perforations 42 are located in the vertical wall of the receptacle near the upper end thereof, it being understood that neither this arrangement nor the specific form of receptacle illustrated is arbitrary. By having the perforations 42 located as described, the tendency of any sediment which may be suspended in the water to enter the receptacle 40 is reduced to a minimum, as the path of the water through the perforations 42 is transverse to the general direction taken by the sediment which normally tends to settle downwardly in the water. In order to insure the proper operation of the locking device when combined with my novel receptacle, I have found it desirable to provide a counterweight 43 located upon a rod 44 which is rigidly carried by the locking member 32 and extends therefrom in a direction substantially opposite to that of the wire 38; the rod 44 may be secured in position in any suitable manner as by means of a set screw 45. The counterweight 43 is of such weight and so located as to overbalance the weight of the receptacle 40 when the latter is empty and also when it is weighted for instance by water and is submerged in the water in the tank 14 when the latter is full. In this latter condition the effect of the water in the receptacle 40 as to weight is neutralized by the water in the tank in which the receptacle 40 is submerged, so that the latter in this condition is buoyantly supported, this buoyancy being added to by the air cushion which forms in the receptacle 40 above the water therein if said receptacle is of the illustrated type. The result is that the receptacle 40 exerts no effect tending to swing the member 32 on its pivot 33 in a direction to move the latch 35 from beneath the projection 36; in other words the counterweight dominates the receptacle and is effective to maintain the latch 35 in the path of the projection 36. When, however, the neutralizing influence of the water in the tank upon the receptacle 40 is removed, for instance because of the emptying of said tank, the combined weight of the receptacle 40 and the water therein is sufficient to overbalance that of the weight 43 and so the receptacle now dominates the weight, with the result that the member 32 is swung in a direction to remove the latch 35 from the path of the projection 36. The purpose of the above will appear more fully from the description hereinafter.

For the purpose of actuating the valve when it is desired to flush the closet bowl, a wire 46 may have its one end connected with the transverse member 28 through the medium of the aperture 29, it being understood that the other end of the said wire may be connected with any of the well known types of devices whereby flush valves are operated. The construction may further include a rod 47 having its one end fastened to a lug 48 forming part of the valve member 22 and passing upwardly through a guide 49 provided on the crossbar 20 into proximity to the upper part of the tank 14. The rod 47 may be used to manually maintain the valve 25 and its connected parts in its raised position, for instance, for the purposes of repair or any other reason.

In its normal position the valve 25 rests upon the seat 12 so that communication between the tank 14 and the sleeve 10 is cut off, it being understood that the valve 25 is maintained firmly against said seat by the weight of the valve member 22 and connected parts and by the pressure of the water in said tank 14. At the beginning, with the tank empty the receptacle 40 and its coöperating parts may occupy approximately the position indicated by dotted lines in Fig. 3. Water is caused to flow into the tank 14 in the usual manner and so as to be automatically controlled in the well known way and gradually rises therein until it reaches the level of the apertures 42 of the receptacle 40. As soon as this happens some of the water passes through said apertures 42 into said receptacle, and, in the illustrated example of my improved receptacle, partly fills the same for instance as shown in Fig. 1 or, in other words, continues to flow through said apertures 42 until stopped by the air cushion which forms in said receptacle above the water therein. Meanwhile the water in the tank 14 continues to rise until the supply is automatically cut off and thus submerges the receptacle 40 and thereby neutralizes the effect of the water in said receptacle as a weight. As a result of this, the receptacle 40 now becomes buoyant and rises or floats in the water in the tank 40 and thereby permits the counterweight 43 to swing the locking member 32 to the position shown in Fig. 1 and in full lines in Fig. 3, in which position the latch is located in the path of the projection 36.

A pull on the wire 46 through the medium of any of the well known actuating devices, causes the valve member 22 to be raised whereby the valve 25 is lifted from the seat 12, the described upward movement including the tubular stem 31 and lugs 30 which in coöperation respectively with the cross-bar 20 and rods 18 serve as guiding means to properly maintain the parts in the intended vertical path. As the valve member 22 and its connected parts are thus raised the projection 36 will finally engage the member 32 and through the camming action of the surface 36ª upon the surface 32ª will swing the member 32 in a direction to permit the projection 36 to pass; as the upward movement is continued said projection 36 will finally rise above the latch 35 whereupon the latter under the influence of the weight 43 is immediately swung beneath said projection 36 and thus maintains the valve in the raised open position illustrated in Fig. 3. It will be understood that the upward movement of the parts as set forth is of sufficient extent to bring about the described engagement of the latch 35 and projection 36.

With the valve in the raised open position, the water in the tank 14 is free to flow through the sleeve 10 and to the closet bowl in volume so that the flushing thereof is efficiently carried out; the outflow of the water from the tank 14 into the sleeve 10 is comparatively unobstructed because of the absence of any cage or similar device of the kind in which many existing types of valves are contained. As the water flows from the tank 14 its level gradually descends therein and finally passes below the apertures 42 in the receptacle 40; a continued descent of said water causes the receptacle to be relieved from its neutralizing effect and thus to lose its buoyancy. In other words, the water in said receptacle finally becomes effective as a weight and added to the weight of the receptacle itself overcomes and dominates the effect of the weight 43 and thus swings the parts to the position shown by dotted lines in Fig. 3. In this position the latch 35 is no longer beneath the projection 36 and the valve member 22 and its connected parts is free to descend until the valve 25 again rests upon the seat 12 and closes the communication between the tank 14 and the sleeve 10. The descent of the valve member 22 and valve 25 with the connected parts is somewhat restrained by the outflowing water so that said descent is comparatively slow and thus permits the tank to become substantially empty before the valve is again closed and at the same time avoids noise and hammer blows.

As soon as the valve 25 is again closed the tank 14 again fills up with water and the receptacle 40 and latch 35 are restored to the position shown in Fig. 1. If for any reason the filling of the tank is not automatically cut off at the proper time the water, in continuing to rise in the tank, will finally reach the upper end of the tube 31 and will overflow into the same and through the tubular nut 27 and sleeve 10 and finally into the closet bowl. The tube 31 in addition to its functions as a valve stem thus also constitutes an efficient overflow pipe whereby overflowing of the tank 14 is effectively prevented; it will be understood that the upper end of the tube 31 is above the level to which the tank is normally filled and that overflow into said tube 31 takes place only if the water rises above its intended highest level. This arrangement does away with the necessity for a separate overflow pipe and provides a compact construction having a minimum number of parts and a maximum of efficiency.

My novel hollow receptacle avoids the possibility of having the device rendered inoperative because of a porous float and increases the life of the structure accordingly and in connection with the locking device and counterweight provides an efficient and simple means whereby the valve is positively locked in its raised position and readily released at the proper time.

It will of course be understood that the receptacle 40 as illustrated is only an example and that it may be modified in many ways without in any way departing from the inventive idea embodied therein; for instance, the apertures 42 may be otherwise located than as shown or they may be replaced by equivalent means, if desired.

It will be noted that the cross-bar 20 is in an easily accessible position and that it is readily detachable from the rods 18 by removing the screws 21, thus permitting the valve and its coöperating parts to be quickly removed from the tank without necessitating the disconnection of the rods 18.

By providing the peripheral, depending flange 24 on the valve member 22, the peripheral edge of the valve packing 25 is covered and thus protected against wear and injury from any cause.

Various other changes in the flush valve as shown and described may be made within the scope of the claim without departing from the spirit of my invention.

I claim:

The combination of a tank for containing a supply of water and having an outlet, upright guide rods contiguous to said outlet, a cross-bar extending between said rods at their upper ends, a valve controlling said outlet, means for raising said valve to an open position, lugs on said valve coöperating with said guide rods to guide said valve in its movements, a projection on one of said lugs, a locking member pivotally connected with said cross-bar and arranged to engage said projection to lock said valve in its open position and a hollow receptacle containing water and directly connected with said locking member, said receptacle normally dominating said locking member whereby the latter is moved to an inoperative position to release said projection and said receptacle being submerged in said supply of water and being rendered inactive thereby against said locking member whereby the latter swings back to an operative position in the path of said projection.

In testimony whereof I have hereunto set my hand.

EDWARD GLENNON.